United States Patent Office 3,061,596
Patented Oct. 30, 1962

3,061,596
EMULSION POLYMERIZATION PROCEDURE
Neiko I. Vassileff, 11834 Lake Ave., Lakewood 7, Ohio
No Drawing. Filed July 31, 1959, Ser. No. 830,709
10 Claims. (Cl. 260—82.5)

This application relates as indicated to a process for producing a polymer by emulsion polymerization techniques.

This application is a continuation-in-part of my copending application Serial No. 746,632 filed July 7, 1958, now abandoned.

The improvements of the present invention are particularly useful in the field of olefin-diolefin co-polymerization reactions, particularly those conducted in the presence of an aqueous medium. The production of synthetic elastomeric co-polymers, such as, for example, butadiene-styrene (Buna S) and butadiene-acrylonitrile (Buna N) co-polymers, among many other olefin-diolefin co-polymerizations, is usually conducted in the presence of a polyvalent metal ion carried in the aqueous medium, the primary purpose of which is to initiate the co-polymerization reaction, after which initiation the normal catalyst, such as, a free radical polymerization initiator, e.g., cumene hydroperoxide, takes over and completes the reaction to the desired degree. In the absence of these initiator metals, the time of reaction is generally unduly prolonged or fails to take place. Many metallic ions may be used for the purpose of initiating these reactions, most notable among which is iron used in the form of ferrous ion from ferrous sulphate, for example. Many other metallic ions of this sort may be used, including chromium, zinc, nickel, cadmium, cobalt, zirconium, titanium, etc. The characteristic feature of these materials is that they are all chelatable, or chelating metals, readily forming complexes known as chelates. In certain instances, the color imparted by these metal ions is objectionable and hence they do not find commercial use. Iron in the amounts found to be effective is inexpensive as well as effective. However, it confers upon the final polymer certain undesirable characteristics. Consequently, a great deal of effort has been devoted to the finding of "initiators" of the wholly organic type, making it thereby possible to avoid the presence of these polyvalent metals in the end product, this usually occurring by occlusion when the reaction mass is coagulated or acidified to recover the polymer. Iron has particularly desirable initiating properties and because of the economics involved is generally preferred. Its presence in the final product, however, causes discoloration, promotes oxidation and hinders vulcanization. Any of the other chelating metals, some of which may be present for purposes other than initiation, also impair the properties of the final product in respect of oxidation and vulcanization.

It is a principal object of the present invention, therefore, to provide an improved emulsion polymerization procedure characterized by the use of a chelating metal control agent which has particularly beneficial effects in the co-polymerization of one or more olefins with one or more diolefins in the presence of such chelating metal initiating compound.

Other objects of the invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

It has been found that, particularly in the emulsion co-polymerization of an olefin with a diolefin, the iron or chelating metal initiator present therein in very minor amounts must be controlled for most effective initiation and for the most effective end product throughout a rather broad range of pH ranging from as low as about 2 up to about 13. Co-polymerizations of the type herein described frequently traverse a range of pH of this magnitude from initiation to separation of the final product. Sequestering agents previously employed have not solved the problem of chelating metal in the end product because they are ineffective except in a relatively minor pH range. When the pH is changed abruptly, these so-called sequestering or chelating materials no longer serve their intended purpose. To overcome this difficulty, it has been found that the utilization of a combination of an alkali metal salt of an aliphatic polyhydroxy monocarboxylic acid in combination with a hydroxy alkyl alkylene diamine polycarboxylate and a separate polyamine polycarboxylate derived from ethylene diamine tetra-acetic acid or ethylene triamine penta-acetic acid in emulsion polymerization procedures provides a unique chelating metal control operable over a broad range of pH.

Briefly stated, therefore, this invention is in the provision of a process of emulsion co-polymerizing a diolefin with a mono-olefin in the presence of ferrous iron or other chelating metal initiator present in aqueous solution, including the step of adding to the polymerization mass from about 0.001 to about 0.5 part by weight per 100 parts of the co-polymerizable admixture of diolefin and mono-olefin of an iron, or chelating metal, control agent comprising in admixture:

(a) From about 5 to about 45 weight parts of a metal salt of an aliphatic polyhydroxy monocarboxylic acid;
(b) From about 15 to about 80 weight parts of a hydroxyl alkyl alkylene diamine polycarboxylate having the general formula:

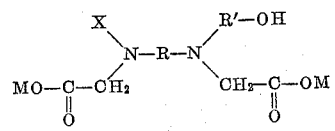

wherein R is an alkylene group containing from 2 to 4 carbon atoms, R' is an alkylene group containing from 1 to 5 carbon atoms, X is selected from the group consisting of —R'—OH, and —CH$_2$—COOM, and M is selected from the group consisting of sodium, potassium, lithium, ammonium and substituted ammonium; and (c) From about 10 to about 75 parts of a polyamine polycarboxylate selected from the group consisting of the alkali metal, ammonium and ferrous salts of ethylene diamine tetraacetic acid and ethylene triamine pentaacetic acid, the total of (a), (b) and (c) being 100 parts by weight.

The chelating metal control agents are conveniently employed as dry powders. They may also be employed in the form of aqueous solutions or pastes, or in the form of organic dispersions or solutions, as may be desired. The nature of the metal ions employed in neutralizing the acidic components will determine to a large extent the solvent system into which these materials are dissolved or dispersed.

One of the principal ingredients in the chelating metal control agent used in the process of this invention is a metal salt of an aliphatic polyhydroxy monocarboxylic acid. Any metal seems to be useful in this capacity, although for purposes of uniformity in relationship to the entire chelating metal control composition, it will be convenient for the metal to confer upon the salt solubility properties consistent with the solubility properties of the remaining ingredients. Thus, where an aqueous medium is to be encountered in the utilization of these materials, it will be found convenient to employ as the salt-forming ion an alkali metal, ammonia, or a substituted ammonia, for example, alkyl amines having the formula $R-NH_2$ or $R_2NH$ wherein R is an alkyl group containing from 1 to 3 carbon atoms. The alkali metals are well known and include sodium, potassium, lithium, cesium and rubidium. Ammonia, of course, confers water-solubility upon the salt. The lower amines likewise confer water-solubility on the end product, particularly because of the presence of more than one hydroxy group in the molecule. The salts which tend to be less water-soluble include the alkaline earth metal salts such as calcium, barium, strontium, magnesium, iron, cobalt, nickel, zinc, chromium, cadmium, manganese, zirconium, titanium, etc.

The aliphatic polyhydroxy monocarboxylates are conveniently derived from naturally occurring sugars and gums, such as, for example, by treatment of a sugar with HCN to form the nitrile followed by hydrolysis to form the monocarboxylic acid. These compounds are characterized by the presence therein of from 3 to 10 or more carbon atoms, at least two hydroxyl groups and most frequently one hydroxyl group attached to each carbon atom including the carboxyl carbon atom, and certain instances such as in the case of material derived from fructose, a carbonyl group intermediate the ends of the aliphatic chain. For most purposes these acids contain 5 or 6 carbon atoms and an equal number of hydroxyl groups including a hydroxyl group forming a part of the carboxyl group. The most notable examples of these materials include sodium gluconate, sodium glucoheptanate, potassium gluconate, ammonium gluconate, calcium gluconate, barium gluconate, zinc gluconate, sodium mannonate, potassium mannonate, sodium glycerate, potassium glycerate, the sodium, potassium, ammonium, and lithium salts of acids derived from natural gums such as guar gum, locust bean gum, gum arabic, gum tragacanth, etc. For most purposes, the alkali metal gluconates, and glucoheptanates, the ammonium gluconates and glucoheptanates, and the amine gluconates and glucoheptanates will be found suitable for use in the compositions intended for aqueous utilization in the processes of this invention, and the calcium, barium, magnesium gluconates and glucoheptanates will be found suitable for use in those procedures involving non-aqueous media.

The second principal component of the chelating metal control compositions useful in the present invention is, as indicated above, a hydroxy alkyl alkylene diamine polycarboxylate having the general formula:

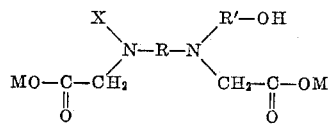

wherein R is an alkylene group containing from 2 to 4 carbon atoms, R' is an alkylene group containing from 1 to 5 carbon atoms, X is a radical selected from the group consisting of $-R'-OH$ and $-CH_2-COOM$, and M is selected from the group consisting of sodium, potassium, lithium, ammonium and substituted ammonium. A particularly suitable example for use as the second component of the chelating metal control composition useful in the processes of this invention is the sodium salt of hydroxy ethyl ethylene-diamine tri-acetic acid. Also of particular utility in accordance herewith is the di-hydroxy ethyl ethylene-diamine di-acetate of sodium. As indicated above, the central alkylene group, R, may be ethylene, propylene or butylene. R' may be methylene, ethylene, propylene, isopropylene, butylene, isobutylene, amylene, isoamylene, etc. The longer the alkylene groups in these compositions, the greater the solubility in non-aqueous media, such as mineral spirits. The alkaline earth metal salts, such as, the barium salt of hydroxy ethyl ethylene diamine tri-acetic acid may conveniently be used in the chelating metal control composition particularly adapted for non-aqueous emulsion polymerization media. Other salts suitable for use as component (b) of the present chelating metal control compositions include the sodium salts of hydroxy propyl, propylene diamine tri-acetic acid, the potassium salt of hydroxy butyl butylene diamine tri-acetic acid, the sodium salt of di-(hydroxy ethyl) propylene diamine di-acetic acid, the calcium salt of hydroxy ethyl ethylene diamine tri-acetic acid, the ammonium salt of hydroxy ethyl ethylene diamine tri-acetic acid, the ethylamine salt of hydroxy ethyl ethylene diamine tri-acetic acid, and similar compounds as will occur to those skilled in the art.

The third principal ingredient of the chelating metal control compositions useful in the processes of the present invention is, as indicated above, a metal salt of a polyamine polycarboxylate in which all of the amino hydrogens have been replaced by carboxyl-containing aliphatic radicals, particularly the methylene carboxyl radical. Specific examples of component (c) of the chelating metal control composition useful in this invention include, therefore, the sodium, potassium, lithium, cesium and rubidium metal salts, the ammonium and substituted ammonium salts and particularly the ferrous salts of ethylene diamine tetra-acetic acid and ethylene triamine penta-acetic acid. The ferrous salts are particularly useful in those compositions to be used in controlling chelating metals and emulsion co-polymerization reactions between olefins and diolefins. In this event, it is unnecessary to add the iron as the ferrous sulphate or other water-soluble ferrous salt.

In formulating the chelating metal control agents useful in the processes of the present invention, the relative proportions of components (a), (b), and (c) as above described are as follows:

Component (a), the metal salt of an aliphatic polyhydroxy monocarboxylic acid, is present in these compositions in an amount ranging from about 5 to about 45 weight parts based on a total of 100 parts by weight of components (a), (b) and (c).

Component (b), the hydroxyl alkyl alkylene diamine polycarboxylate, is generally present in amounts ranging from about 15 to about 80 weight parts based on a total weight of 100 parts of components (a), (b) and (c).

Component (c), the polyamine polycarboxylate, is generally present in these compositions in amounts ranging from about 10 to about 75 parts by weight based on a total weight of components (a), (b) and (c) of 100 parts.

It becomes convenient at this point to illustrate several illustrative examples of chelating metal control compositions formulated in accordance with the foregoing and useful in the process of emulsion co-polymerization.

*Example 1*

| | Parts by weight |
|---|---|
| Sodium gluconate | 35 |
| The sodium salt of hydroxy ethyl ethylene diamine tri-acetic acid | 52 |
| The sodium salt of ethylene diamine tetra-acetic acid | 13 |

*Example 2*

| | |
|---|---|
| Sodium gluconate | 5 |
| The sodium salt of hydroxy ethyl ethylene diamine tri-acetic acid | 75 |
| The sodium salt of ethylene diamine tetra-acetic acid | 20 |

Example 3

| | Parts by weight |
|---|---|
| Sodium gluconate | 10 |
| The sodium salt of hydroxy ethyl ethylene diamine tri-acetic acid | 15 |
| The sodium salt of ethylene diamine tetra-acetic acid | 75 |

Example 4

| | |
|---|---|
| Sodium gluconate | 27 |
| The sodium salt of hydroxy ethyl ethylene diamine tri-acetic acid | 40 |
| The sodium salt of ethylene diamine tetra-acetic acid | 33 |

Example 5

| | |
|---|---|
| Sodium gluconate | 12 |
| The sodium salt of hydroxy ethyl ethylene diamine tri-acetic acid | 17 |
| The ferrous salt of ethylene diamine tetra-acetic acid | 42 |
| The sodium salt of ethylene diamine tetra-acetic acid | 30 |

Example 6

| | |
|---|---|
| Sodium gluconate | 13 |
| The sodium salt of hydroxy ethyl ethylene diamine tri-acetic acid | 53 |
| The sodium salt of ethylene diamine tetra-acetic acid | 34 |

Example 7

| | |
|---|---|
| Sodium gluconate | 25 |
| The sodium salt of hydroxy ethyl ethylene diamine tri-acetic acid | 58 |
| The sodium salt of ethylene diamine tetra-acetic acid | 17 |

The foregoing compositions are dry, white powders which are completely soluble in water, and which may be conveniently admixed with water prior to use or added directly to an aqueous reaction medium. The compositions of the foregoing examples may be used in amounts ranging from 0.001% to about 0.5% by weight of the co-polymerizable monomers present in the emulsion polymerization reaction mass. Amounts in excess of 0.5% may be used, if desired, but such employment is unnecessary and expensive.

It becomes convenient at this point to illustrate the process of the present invention by giving examples of typical emulsion co-polymerization reaction recipes of olefins with diolefins, it being understood that these examples are only for illustrative purposes and not to be regarded as limiting the scope of the invention to the precise scope thereof.

Generally speaking, the diolefin employed in these reactions is butadiene although there may be used in place of the butadiene in the following formula such dienes as poly-isoprene, isoprene (2-methyl-1,3-butadiene), chloroprene (2-chloro-1,3-butadiene); and instead of the styrene, which is an example of the mono-ethylenically unsaturated olefin, there may be used vinyl toluene, acrylonitrile, alpha-methyl styrene, 2-vinylpyridine, etc. The chelating metal control agent may also be used in emulsion polymerization procedures involving the interpolymerization of three or more monomeric reactions.

A typical recipe for a butadiene-styrene synthetic rubber of the GRS type is as follows:

Example 8

| | Parts |
|---|---|
| Butadiene | 72 |
| Styrene | 28 |
| Tertiary dodecyl mercaptan | 0.17 |
| Potassium salt of disproportionated rosin | 4.50 |
| Sodium hydroxide | 0.31 |
| Trisodium phosphate | 0.50 |
| Sodium alkyl naphthalene sulfonate-formaldehyde condensation product | 0.10 |
| Potassium pyrophosphate | 0.18 |
| Ferrous sulphate heptahydrate | 0.16 |
| Cumene hydroperoxide | 0.01 |
| Water | 200.0 |
| Product of Example 1 | 0.1 |

The foregoing ingredients may be polymerized under the cold rubber polymerization procedure which is carried out at a temperature of about 5° C. for a period of about 30 minutes to attain a 60% conversion. The synthetic rubber which results from the foregoing procedure polymerizes well and rapidly, yielding a product which is free from unsightly discoloration caused by unremoved iron in the usual cold rubber polymerization technique.

Example 9

| | Parts |
|---|---|
| Butadiene | 72 |
| Styrene | 28 |
| Tertiary dodecyl mercaptan | 0.17 |
| Potassium soap of disproportionated rosin | 4.50 |
| Sodium hydroxide | 0.10 |
| Trisodium phosphate | 0.50 |
| Sodium alkyl naphthalene sulfonate-formaldehyde condensation product | 0.10 |
| Potassium pyrophosphate | 0.2 |
| Cumene hydroperoxide | 0.01 |
| Water | 200 |
| Product of Example 5 | 0.1 |

The foregoing composition polymerized under the conditions of the cold rubber polymerization technique at about 5° C. for a period of up to 30 minutes to yield a product of 60% conversion, is produced without the addition of ferrous sulphate heptahydrate or other such water soluble ferrous salts.

Example 10

| | Parts |
|---|---|
| Butadiene | 70 |
| Styrene | 30 |
| Potassium soap of disproportionated rosin | 4.5 |
| Trisodium phosphate dodecahydrate | 0.8 |
| Sodium salt of alkyl naphthalene sulphonic acid-formaldehyde condensation product | 0.15 |
| Sodium formaldehyde sulphoxylate dihydrate | 0.15 |
| Product of Example 5 | 0.20 |
| p-Methane hydroperoxide | 0.10 |
| Tertiary dodecyl mercaptan | 0.20 |
| Water | 200.0 |

The foregoing is a typical sulphoxylate formulation utilizing instead of the ferrous sulphate initiator commonly used, the product of Example 9. This recipe is capable of rapid polymerization to about 60% conversion at 5° C. in under six hours. Synthetic rubber produced by this process is free of iron staining and has improved physical and chemical properties particularly in respect of resistance to oxidation, and improved vulcanization properties. Better control of particle size is also secured.

Example 11

| | Parts |
|---|---|
| Butadiene | 75 |
| Acrylonitrile | 25 |
| Sodium stearate | 4.50 |
| Stearic acid | 0.6 |
| Lauryl mercaptan | 0.5 |
| Potassium chloride | 0.3 |
| Sodium pyrophosphate | 0.15 |
| Stearic sulphate | 0.02 |
| Benzoyl peroxide | 0.30 |
| Water | 200 |
| Product of Example 1 | 0.25 |

The foregoing polymerization reaction can be carried out at a temperature of about 5° C. for a period of from 12 to 48 hours. The latex is coagulated by flocculating the particles with brine, a sulphonate and an acid in the usual manner. The particles are filtered off on a rotary filter, reslurried in water and again filtered to remove silt. The crumbs are then made alkaline to resaponify the soap and then sheeted on a Fourdrinier machine washed and pressed to form a sheet.

The foregoing product is free from the discoloration produced by the presence of iron in co-polymerizations conducted in the absence of the product of Example 1.

Following procedures similar to those given in Examples 8, 9, 10 and 11 above, amounts of the products of Examples I through 7 ranging from 0.01% to 0.5% or more per 100 parts of co-polymerizable monomers may be used. The temperatures may range from 5° to 50° C. or more.

While it is not desired to be bound by any theory or mechanism of reaction, it is believed that a complex relationship among the several ingredients exists dependent to some extent upon the relative ease of chelation of metals with several ingredients under various conditions of pressure, temperature and acidity or alkalinity, is responsible for the very unusual effect and wide applicability of the materials. It has been found, for example, in the aqueous emulsion polymerization technique where iron is present, that the iron from the aqueous solution chelates very readily with the sodium ethylene diamine tetra-acetic acid ingredients. In this form the iron initiates a reaction co-polymerization in alkaline medium very readily. The presence of other ingredients at this time seems to improve the initiation over that which is secured when iron is present in the absence of the other ingredients of the chelating metal compositions useful in the process of the present invention. The hydroxy alkyl alkaline diamine polycarboxylate acts as a sequestering agent for the iron and controls its presence in the reaction mass at the pH's where the polymerization is normally performed. When the reaction of co-polymerization has been carried to the desired extent the reaction mass is generally acidified for purposes of coagulating, particularly in the production of the synthetic rubber such as Buna S and Buna N illustrated above using the cold rubber process. Normally high alkalinity impairs the sequestering power and the chelating power of the diamine derivatives for iron. However, the metal gluconate, or equivalent material, seems to have the ability to maintain the aqueous solution of iron even at the increased pH's encountered in polymerization procedures. Instead of iron hydroxide being precipitated in appreciable amounts and encapsulated by the coagulant, it is retained in solution by means of the metal salt of the polyhydroxy monocarboxylate. It is believed that similar chelating metal control is at work in the various other media in which these compositions find utility. The foregoing is only a theoretical explanation, the subject of chelation being still in its infancy.

The use of the chelating metal control agents in the processes of the present invention in low temperature emulsion co-polymerization reactions involving co-polymerization of styrene with butadiene, for example, at about 41° C., the polymer being composed, for example, of 70 parts of butadiene, 30 parts of styrene in the presence of a redox type catalyst system and ferrous sulphate heptahydrate is illustrated by the addition to the aqueous system of 0.1 part by weight per 100 parts of co-polymerizable monomers by weight of the composition of Example 3 above. The amount of water in these reactions is about twice the weight of the co-polymerizable monomers. Where the ferrous sulphate heptahydrate or its equivalent is omitted from the reaction mass, then the ferrous salt of component (c) as herein described (Example 5) is of particular utility in the cold process synthetic rubber such as described above.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. In the process of emulsion co-polymerizing a diolefin with a mono-olefin in the presence of ferrous iron in aqueous solution, the improvement which comprises the step of adding to the polymerization mass from about 0.001 to about 0.5 part by weight per 100 parts of the co-polymerizable admixture of diolefin and mono-olefin, of an iron control agent comprising in admixture:
   (a) from about 5 to about 45 weight parts of a salt of an aliphatic polyhydroxy monocarboxylic acid of from 3 to 10 carbon atoms containing at least two hydroxyl groups with a cation selected from the group consisting of alkali metal, ammonium and lower alkyl substituted ammonium.
   (b) from about 15 to about 80 weight parts of a hydroxy alkyl alkylene diamine polycarboxylate having the general formula:

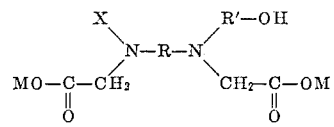

wherein R is an alkylene group containing from 2 to 4 carbon atoms, R' is an alkylene group containing from 1 to 5 carbon atoms, X is selected from the group consisting of —R'—OH, and $$-CH_2-COOM$$

and M is selected from the group consisting of sodium, potassium, lithium, ammonium and substituted ammonium; and
   (c) from about 10 to about 75 parts of a polyamine polycarboxylate selected from the group consisting of the alkali metal, ammonium and ferrous salts of ethylene diamine tetra-acetic acid and ethylene triamine penta-acetic acid, the total of (a), (b) and (c) being 100 parts by weight, said ingredients coacting in the reaction mass to control the iron content thereof over the range of pH from initiation of the reaction to separation of the co-polymer.

2. In the process of emulsion co-polymerizing a diolefin with a mono-olefin in the presence of ferrous iron in aqueous solution, the improvement which comprises the step of adding to the polymerization mass from about 0.001 to about 0.5 part by weight per 100 parts of the co-polymerizable admixture of diolefin and mono-olefin, of an iron control agent comprising in admixture:
   (a) from about 5 to about 45 weight parts of a salt of an aliphatic polyhydroxy mono-carboxylic acid of from 3 to 10 carbon atoms containing at least two hydroxyl groups with a cation selected from the group consisting of alkali metal, ammonium and lower alkyl substituted ammonium;
   (b) from about 15 to about 80 weight parts of a hydroxyl alkyl alkylene diamine polycarboxylate having the general formula:

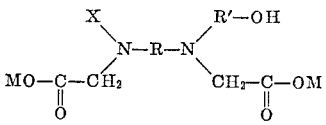

wherein R is an alkylene group containing from 2 to 4 carbon atoms, R' is an alkylene group containing from 1 to 5 carbon atoms, X is selected from the group consisting of —R'—OH, and —CH₂—COOM, and M is selected from the group consisting of sodium, potassium, lithium, ammonium and substituted ammonium; and (c) from about 10 to about 75 parts of the ferrous salt of ethylene diamine tetraacetic acid, the total of (a), (b) and (c) being 100 parts by weight, said ingredients coacting in the reaction mass to control the iron content thereof over the range of pH from initiation of the reaction to separation of the co-polymer.

3. A process in accordance with claim 1 in which component (a) is the sodium salt of an aliphatic polyhydroxy monocarboxylic acid.

4. A process in accordance with claim 1 in which component (a) is sodium gluconate.

5. A process in accordance with claim 1 in which R in component (b) is ethylene.

6. A process in accordance with claim 1 in which X in component (b) is —CH₂—COOM.

7. A process in accordance with claim 1 in which component (b) is the tri-sodium salt of hydroxy ethyl ethylenediamine tri-acetic acid.

8. A process in accordance with claim 1 in which component (c) is sodium ethylenediamine tetra-acetic acid.

9. A process in accordance with claim 1 in which component (a) is sodium gluconate, and component (b) is the tri-sodium salt of hydroxy ethyl ethylenediamine triacetic acid.

10. A process in accordance with claim 1 in which component (a) is sodium gluconate, component (b) is the tri-sodium salt of hydroxy ethyl ethylenediamine triacetic acid and component (c) is sodium ethylenediamine tetra-acetic acid.

References Cited in the file of this patent

UNITED STATES PATENTS

| | | |
|---|---|---|
| 2,584,017 | Dvorkovitz | Jan. 29, 1952 |
| 2,631,142 | Williams | Mar. 10, 1953 |
| 2,655,495 | Williams | Oct. 13, 1953 |
| 2,915,444 | Meyer | Dec. 1, 1959 |